United States Patent [19]
Carter et al.

[11] Patent Number: 4,980,836
[45] Date of Patent: Dec. 25, 1990

[54] APPARATUS FOR REDUCING COMPUTER SYSTEM POWER CONSUMPTION

[75] Inventors: Robert R. Carter, Cypress; Paul M. Garner, The Woodlands; Darren J. Cepulis; Carrie Boone, both of Houston, all of Tex.

[73] Assignee: Compaq Computer Corporation, Houston, Tex.

[21] Appl. No.: 257,954

[22] Filed: Oct. 14, 1988

[51] Int. Cl.$^5$ .................... G01R 19/00; H02J 3/14
[52] U.S. Cl. ........................... 364/483; 364/141; 364/200; 364/273.5; 307/31; 307/38
[58] Field of Search .............. 364/138, 140, 141, 148, 364/481, 483, 550, 551.01, 200, 900; 307/38, 39, 41, 31

[56] References Cited

U.S. PATENT DOCUMENTS

| 4,316,247 | 2/1982 | Iwamoto | 364/200 |
| 4,510,398 | 4/1985 | Culp et al. | 364/483 |
| 4,538,231 | 8/1985 | Abe et al. | 364/483 |
| 4,568,934 | 2/1986 | Allgood | 364/483 |
| 4,751,653 | 6/1988 | Junk et al. | 364/481 |

OTHER PUBLICATIONS

Zenith Data Systems Corp., Z-180 PC Series Technical Reference Manual, 1987, pp. 14-2 to 14-3.
IBM Corp., PC Convertible Technical Reference, vol. 1, First Edition, Feb. 1986, pp. 2-11, 4-7 to 4-10, 4-37 to 4-41, D-3 to D-4.

Primary Examiner—Parshotam S. Lall
Assistant Examiner—Brian M. Mattison
Attorney, Agent, or Firm—Pravel, Gambrell, Hewitt, Kimball & Krieger

[57] ABSTRACT

A battery powered computer system monitors the address bus to determine when selected peripheral devices have not been accessed for a preset amount of time. When the preset amount of time has passed the system powers itself down and stops the system clock, placing it in a standby mode. The system is awakened by depressing a standby switch, unless there is insufficient energy in the batteries, under which circumstances an AC power source must be connected before the system can be awakened.

13 Claims, 11 Drawing Sheets

APPARATUS FOR REDUCING COMPUTER SYSTEM POWER CONSUMPTION

BACKGROUND OF THE INVENTION:

1. Field of the Invention

The invention relates to battery powered computer systems, and more particularly, to circuits and methods for reducing the power consumption of the computer system.

2. Description of the Prior Art

Portable computer systems are rapidly developing the capabilities of conventional desktop or floor mounted personal computer systems. Hard disk units are being integrated into portable computers because of the large amounts of information being processed and the large size of many applications programs. At east one floppy disk unit is integrated in the vast majority of portable computers, even if a hard disk unit is installed, to allow loading of information and use of applications requiring key disks and of diagnostic programs. Modems have been integrated into portable computers for some time to allow communications and information transfer between the user and a remote location, for example, the home office. The displays in the portable computer systems are becoming much more elaborate and readable. The pixel count on the standard liquid crystal displays (LCD's) utilized is increasing, as is the viewing angle. The use of backlighting allows use of LCD's in low light environments and improves the contrast ratio of the display. More complex circuitry is being installed in the portable computers to support these improved peripheral devices and to support the increased speeds and capabilities of the microprocessors utilized in the portable computer systems.

The various peripheral devices and high speed circuitry mentioned above consume large amounts of power when operating. This has made it very difficult to provide all the possible functionality available and yet have an acceptable battery life when the portable computer system is battery powered, so that it can be used in locations where alternating current is not available. Using CMOS components helped reduce the power consumption of the circuitry, but even the use of CMOS components is insufficient at the clock speeds and performance levels of available circuitry. Therefore, a dilemma arises whether to provide lesser functionality with longer battery life or greater functionality with lesser battery life or even no battery operation.

Various alternatives were tried to resolve the problem. For example, the IBM Corporation PC Convertible included a switch which the user could press to place the computer system in a standby mode, but the PC convertible was relatively simple, with a low level of functionality as compared to what is currently available and the requirement of a user action limited its use to circumstances where the user remembered to depress the switch. Blanking the display after a period of keyboard inactivity saved power as well as prolonged the life of the display and was widely utilized. A hard disk unit was developed which reduced the power used by the controlling electronics by utilizing only certain portions of the track for servo information and turning off the read channel circuitry until just before a servo burst was expected. Additionally, a programmable value could be provided to the hard disk unit so that after a given inactivity interval defined by this value, the hard disk unit was allowed to spin down and all but some interface circuitry was shut down. While these alternatives did provide some relief, they were not complete solutions to satisfactorily resolve the dilemma and design tradeoffs still were forced to occur.

SUMMARY OF THE INVENTION

A battery powered portable computer system according to the present invention determines when the computer system is not in use by monitoring peripheral device activity and shutting down the system after a given inactivity period, thus entering a standby mode. The entry is not dependent on an action by the user, but occurs automatically.

The system monitors accesses to the hard disk unit, the floppy disk unit, the keyboard, the serial ports and the printer to determine if the system is active. If so, a timer is restarted on each access. If the timer counts down to zero, then the system is considered inactive and power is removed from the hard disk unit, the floppy disk unit, the LCD, and miscellaneous circuitry, and the system clock provided to the microprocessor and other portions of the circuitry is stopped. Stopping the clock dramatically reduces the power consumed by the circuitry because CMOS devices, which are utilized in the preferred embodiment, consume very little power at zero frequency operation.

To bring the computer system out of this standby mode, the user depresses a switch which starts the wake up operation. However, if the charge remaining in the batteries is below a given level referred to as low battery 2, the system will not wake up or leave standby operation. This prevents the data in the machine from being lost when the powering up process consumes the remaining energy in the batteries.

The inactivity interval timer is set at a first value when the computer system is turned on, with the interval value changeable by the user thereafter. The interval value is reduced automatically when the battery charge reaches a level referred to as low battery 1 and is reduced to a very small value when the battery charge reaches low battery 2. The interval is also set to a very short interval when the user presses the standby switch while they system is operating. The inactivity interval is not utilized when the computer system is powered from an alternating current (AC) source, such as an AC adaptor/battery charger or mating expansion unit.

This invention allows the battery powered operating period of the computer system to be greatly extended, thus allowing the use of advanced capabilities and functions while having a satisfactory battery operated operating interval.

BRIEF DESCRIPTION OF THE FIGURES

A better understanding of the invention can be obtained when the following detailed description of the preferred embodiment is considered in conjunction with the following drawings, in which.

DETAILED DESCRIPTION OF THE PREFERRED EMBODIMENT

Figure 1:
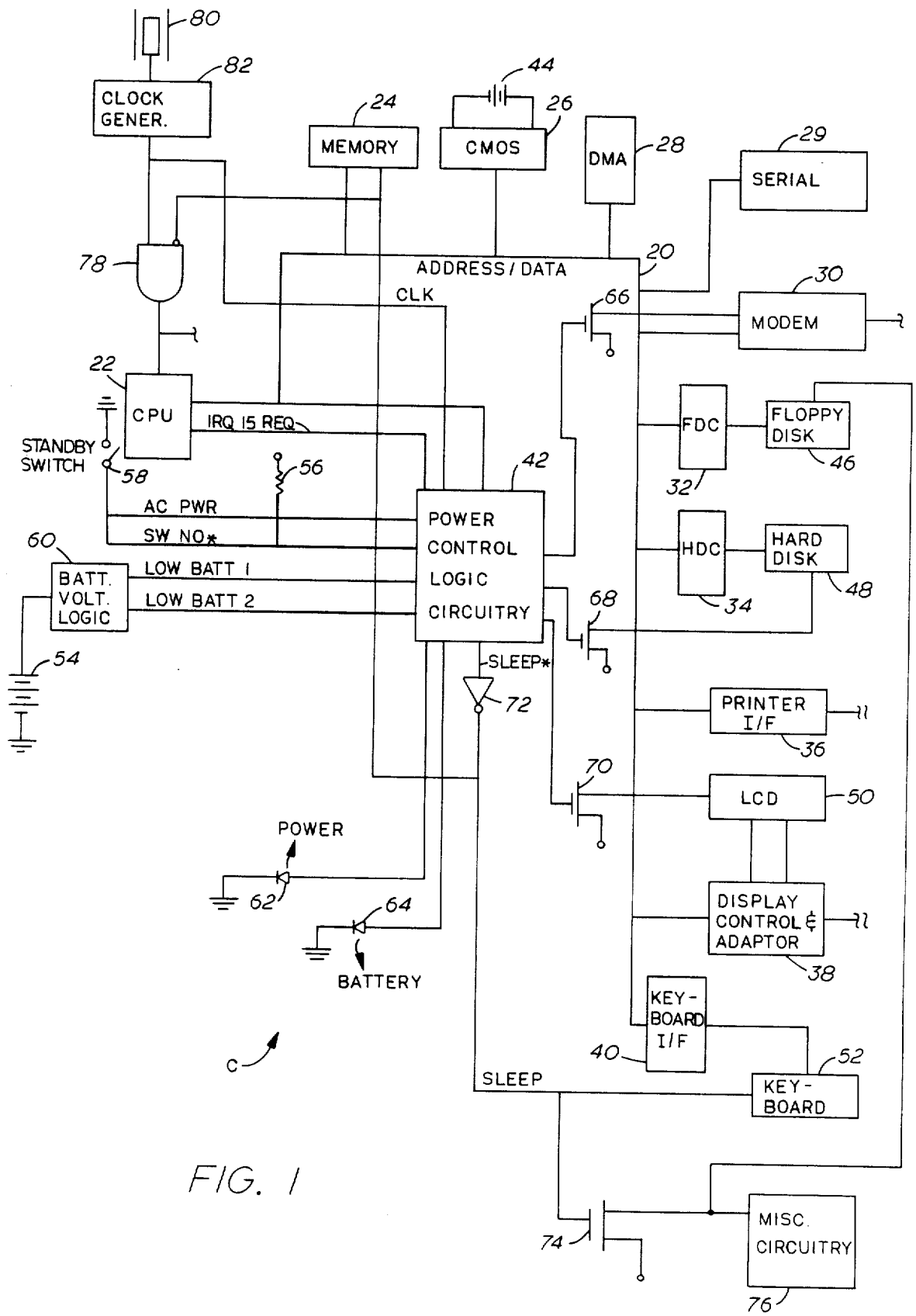
FIG. 1 is a schematic block diagram of a computer system incorporating the present invention.

Referring now to FIG. 1, the letter C generally represents a computer system incorporating the present invention. An address and data bus 20 is the primary communication pathway in the computer system C. Attached to this address and data bus 20 are numerous units, including a central processing unit or microprocessor 22, memory devices 24, a CMOS memory and clock 26, a direct memory access (DMA) controller 28, a serial interface 29, a modem 30, a floppy disk controller 32, a hard disk controller 34, a parallel printer interface 36, a display controller and adaptor 38, a keyboard interface 40, and power control logic circuitry 42.

The microprocessor or CPU 22 is preferably a CMOS version of the Intel Corporation 80286 microprocessor. The CMOS version of the processor is preferable because of its lower power consumption while operating and because it is a fully static device which is capable of operating with a zero frequency clock and yet not losing any data. The memory devices 24 are composed of read-only memories (ROM's) and random access memories (RAM's). The RAM's in the preferred embodiment are preferably pseudostatic devices which contain their own individual refresh circuitry so that other portions of the computer C need not be activated to provide refresh signals to the memories during low power consumption modes. The CMOS memory 26 is preferably powered by its own separate battery 44 so that certain critical or useful system configuration information can be retained at all times and not be stored on disk units or prompted for each time the computer system C is turned on. The serial interface 29 is preferably an asynchronous interface and includes the customary universal asynchronous receiver transmitter (UART) devices and appropriate buffering and level shifting circuitry. The modem 30 also contains the appropriate UART to perform the parallel/serial conversions necessary and contains the necessary tone developing and receiving circuitry and telephone line interface circuitry to allow the modem 30 to communicate over conventional telephone lines.

The floppy disk controller 32 interfaces to a floppy disk 46 drive. The hard disk controller 34 is coupled to a hard disk unit 48. The hard disk unit 48 in the preferred embodiment is of a design as indicated in the prior art section as being appropriate for low power consumption applications. The display controller and adaptor 38 is coupled to a liquid crystal display (LCD) 50. The LCD 50 in the preferred embodiment includes a backlight. The display controller and adaptor 38 includes the capability to bank the LCD 50 after a period of time has elapsed without a keystroke entry, to preserve the life of the LCD 50 and to reduce power consumption. In the preferred embodiment the display controller and adaptor 38 is designed to be compatible with a standard referred to as the VGA standard. The display controller and adaptor 38 is designed to be optionally connected to an external high quality color monitor and therefore includes the necessary circuitry, such as a RAMDAC or color palette device, to allow the utilization of the monitor. The keyboard interface 40 connects the CPU 22 to a keyboard 52, which includes a dedicated microprocessor for key scanning functions and communication with the keyboard interface 40 and has a line to receive a power down signal from the power control logic circuitry 42.

A power control logic circuitry 42 performs the functions of monitoring the address and data bus 20 and determining the intervals since the last access to the serial port 29, the modem 30, the hard disk controller 34, the printer interface 36 or the keyboard interface 40 or appropriate accesses to the floppy disk controller 32. The power control logic circuitry 42 monitors the state of a line called ACPWR, which line indicates whether the power which is being consumed by the computer system C is being supplied by an alternating current source or whether the computer system C is operating off of its internal batteries 54. The power control logic circuitry 42 monitors a line referred to as the SWN0* line, which is pulled up to a high level by a resistor 56 and which is connected to ground by a standby switch 58. The presence of an asterisk after a signal or line indicates that the signal or line is an active or true low signal or line, rather than the conventional active or true high state. The standby switch 58 is a normally open switch which is momentarily closed by the user and is used to place the computer system C in standby mode or wake the computer system C up from standby mode. Additionally, the power control logic circuitry 42 monitors the status of two signals referred to as LOWBAT1 and LOWBAT2, which are developed by the battery voltage logic 60 which monitors the charge remaining in the batteries 54. If the charge is below a first given level indicating that approximately only 10% of a full charge remains, this is the LOWBAT1 level and the LOWBAT1 signal is set to reflect this state. If the batteries continue to be discharged, they eventually reach a second lower energy level, which is referred to as the LOWBAT2 level and the LOWBAT2 signal is set accordingly. The LOWBAT2 level is reached when approximately only 5% of a full charge remains in the batteries 54. These level signals are provided to indicate to the user warning levels relating to the amount of time available before depletion of the battery and to indicate to the computer system C the advisability of operating at full power levels.

The power control logic circuitry 42 has a number of outputs. Two outputs are used to drive the power light emitting diode (LED) 62 and the battery state LED 64. The power control logic circuitry 42 drives the power LED 62 in a continuous fashion if the computer system C is turned on and not in standby mode. If the computer system C is in standby mode, indicating that it is in its low power consumption mode and is halted, the power LED 62 is flashed to provide an indication to the user. The battery LED 64 is off when the battery is sufficiently charged, begins flashing at a first relatively slow rate of 1 Hz when the LOWBAT1 condition exists and flashes at a higher rate, for example a 2 Hz rate, when the LOWBAT2 condition exists. These various battery level warnings are visual indicators to the user as to the remaining energy in the batteries. The power control logic circuitry 42 has a series of outputs which are connected to several field effect transistors (FET's) 66, 68 and 70, which are used, respectively, to control power to the modem 30, the hard disk 48, and the LCD 50.

The power control logic circuitry has an output referred to as the SLEEP* signal which is provided to an inverter 72 to produce the SLEEP signal. The presence of an active or true SLEEP signal indicates that the computer system C is in sleep or standby mode. The SLEEP signal is connected to the keyboard 52 to cause the keyboard electronics and microprocessor to go into a low power condition. Additionally, the SLEEP signal is provided to an FET 74 to remove power from various miscellaneous circuitry 76 in the computer system C. It is to be noted that power is not removed from many portions of the computer system C, such as the CPU 22 and the memories 24. The SLEEP signal is provided to the memory devices 24 to cause the RAM's to enter their pseudostatic mode and begin controlling their own refresh.

The SLEEP signal also is inverted and provided to the input of a two input clock AND gate 78 used to disable the system clock. A crystal 80 is connected to a clock generator circuit 82 which produces a CLK signal which is provided to the power control logic circuitry 42 for its internal clocking functions and which is provided to the second input of the clock AND gate 78. The output of the clock AND gate 78 is the system clock which is used by the CPU 22 and other portions of the computer system C for clocking functions. Thus when the SLEEP signal is at a high state, the output of the AND gate 78 is at a low state, thereby stopping the system clock and causing the clocked CMOS circuitry located in the computer system C to go into a very low power state. Alternatively, if it is desired that the system clock be stopped at a high level, the clock AND gate 78 can be replaced by an OR gate and the SLEEP signal directly applied. For details regarding stopping the clock signal to the CPU 22, refer to Harris Corporation ADC 286 Hardware Reference Manual, p. A-6, the contents of which are incorporated by reference herein.

Figure 2:
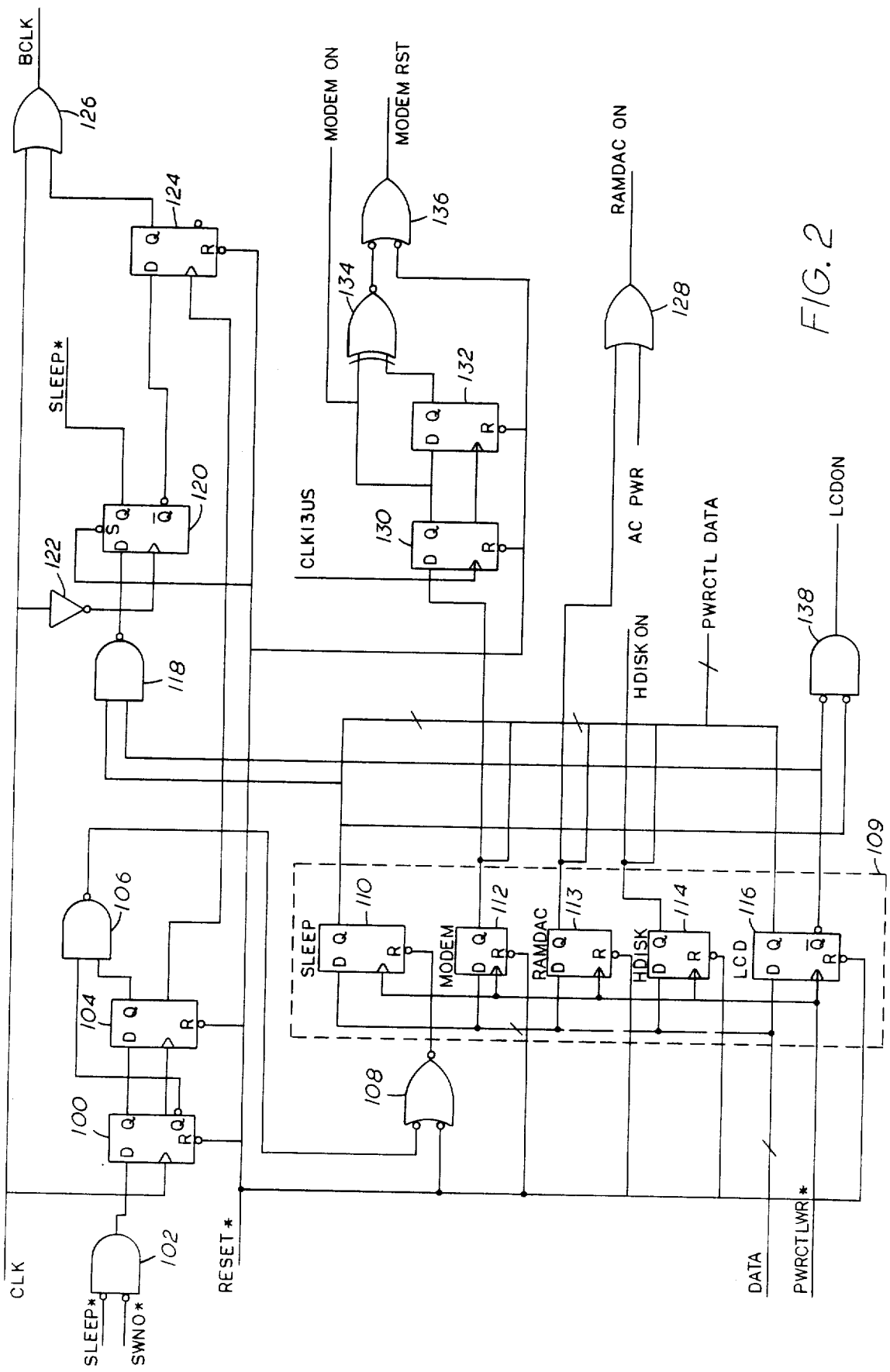
FIGS. 2, 3, 4 and 5 are more detailed schematic logic diagrams of portions of the computer system of FIG. 1.

The CLK signal developed by the clock generator circuit 82 is tied to the clocking input of a D-type flip-flop 100 (FIG. 2). The D input to the flip-flop 100 is provided by the output of a two input NOR gate 102. The inputs to the NOR gate 102 are the SLEEP* signal developed by the power control logic circuitry 42 and the SWN0* signal provided to the power control logic circuitry 42. The NOR gate 102 is used to indicate and receive the depressing of the standby switch 58 when the system is in standby mode to begin the wake up procedure. When both signals are in a low state indicating that the computer system C is in standby mode and the user desires to wake up the computer system C, the low signal present at the D input is clocked to the Q or noninverting output of the flip-flop 100 on the next rising edge of the CLK signal. The noninverted output of flip-flop 100 is provided to the D input of a D-type flip-flop 104. The clocking signal of the second D-type flip-flop 104 is also the CLK signal. The inverted output of flip-flop 100 and the non-inverted output of flip-flop 104 are inputs to a two input NAND gate 106. The output of the two input NAND gate 106, whose active condition is a low pulse one CLK signal cycle in length after the standby switch 58 is released, is provided to one input of an AND gate 108, whose output is applied to the reset input of a sleep D-type flip-flop 110.

The sleep flip-flop 110 is one bit in a register referred to as the power control register 109. The power control register 109 contains the storage elements which control and indicate which of the peripheral devices and the system are powered on. The power control register 109 is readable by the computer system C and writeable by the computer system C. The various additional storage elements comprising the power control register 109 are a modem D-type flip-flop 112, a RAMDAC d-type flip-flop 113, a hard disk D-type flip-flop 114, and an LCD D-type flip-flop 116. All of the flip-flops in the power control register register 109 have their D inputs coupled to the appropriate lines of the data bus 20 through buffers (not shown) and have their clocking inputs tried to a signal referred to as PWRCTLWR*. The PWRCTLWR* signal is a signal which indicates that a write operation has been directed to the power control register 109 and is of a phase such that the rising edge of the signal is available when the data is valid at the inputs to the various flip-flops. The non-inverted outputs of the power control register flip-flops are combined to form the PWRCTL data lines and are connected to the system address and data bus 20 via appropriate buffering devices (not shown).

When the computer system C is in standby mode, which may be referred to as being asleep, and the operator presses the standby switch 58, a one CLK signal length pulse is developed at the output of the NAND gate 106 when the standby switch 58 is released and is applied to the reset input of the sleep flip-flop 110. This pulse resets the noninverting output of the sleep flip-flop 110. The noninverting output of the sleep flip-flop 110 is connected to one input of a two input NAND gate 118. The other input of NAND gate 118 is connected to the inverted output of the LCD flip-flop 160. This dual connection of the sleep flip-flop output 110 and the LCD flip-flop 116 output is used in the preferred embodiment because of constraints relating to the powering sequence of the LCD 50. Therefore when the output of the sleep flip-flop 110 goes low, the output of NAND gate 118 goes high and therefore the signal present at the D input of a D-type flip-flop 120 goes high. This flip-flop 120 is clocked by the inverted CLK signal as produced by an inverter 122. When the next falling edge of the CLK signal is encountered, the SLEEP* signal, which is the non-inverted output of flip-flop 120, goes high indicating that the computer system C is no longer in standby mode. The SLEEP* signal feeds back to NOR gate 102 to clear the pulse provided by NAND gate 106.

The inverting output of flip-flop 120 is connected to the D input of a D-type flip-flop 124. The clocking input to flip-flop 124 is provided by the CLK signal, so at the next rising edge of the CLK signal the noninverting output of flip-flop 124 goes low. This output of the flip-flop 124 is tied to one input of a two input OR gate 126, with the other input of the OR gate 126 being the CLK signal. Thus, when the noninverting output of flip-fop 124 is low, the output of the OR gate 126 proceeds to follow the CLK signal and is referred to as the BCLK signal. This is the blocked clock or stopped cock signal for use with the power control logic circuitry 42 so that when the computer system C is in standby mode even the portions of the power control circuitry 42 which can be stopped are stopped.

When the computer system C is to enter standby mode, the inverting output of the LCD flip-flop 116 is in a high state because in the preferred embodiment it is desired that the LCD power be turned off prior to removing the clock from the various portions of the computer system C. The noninverting output of the sleep flip-flop 110 is set high on a following access of the CPU 22 to the power control register 109, so that both inputs of the two input NAND gate 118 are high so that a low signal is presented to the input of flip-flop 120. At the next falling edge of the CLK signal the SLEEP* signal goes low, indicating that the computer system C is in the standby mode and the inverting output of flip-flop 120 goes high, which output is then clocked through flip-flop 124 to stop operation of the clock to the other portions of the power control logic circuitry 42 by means of OR gate 126.

The non-inverted output of the RAMDAC flip-flop 113 is supplied to one input of an OR gate 128. The second input to OR gate 128 is the ACPWR signal, which indicates that AC power is applied. The output of the OR gate 128 is a RAMDACON signal to indicate the power should be turned on to the RAMDAC located in the display control adaptor 38. As discussed, the RAMDAC is useful only with an external monitor in the preferred embodiment because the LCD display is not color and therefore there is no need to perform the necessary color pallette lookups performed by the RAMDAC. Therefore if the RAMDAC bit is set on or the computer system C is being powered by the external AC supply, the RAMDAC is turned on. Otherwise the RAMDAC is turned off to conserve power.

The non-inverting output of the modem flip-flop 112 is supplied to the D input of a D-type flip-flop 130. The clocking signal to this flip-flop is a signal referred to as CLK13μS which provides an approximate 13 microsecond clocking signal to flip-flop 130. The output of flip-flop 130 is the MODEMON signal and is supplied to the D input of a second D-type flip-flop 132 and to one input of a two input EQUAL gate 134. The MODEMON signal is supplied to an FET 66 to control the power to modem 30. The second flip-flop 132 is also clocked by the CLK13μS signal and has its non-inverting output connected to the second input of the EQUAL gate 134. The output of the EQUAL gate 134 is supplied to one input of a two input NAND gate 136. The output of NAND gate 136 is referred to as the MODEMRST signal, the modem reset signal. The second input of the NAND gate 136 is connected to the RESET* signal, which is the main reset signal present in the computer system C. Assuming that the RESET* signal is high, the MODEMRST signal is pulsed high for one 13 microsecond CLK signal cycle when the modem flip-flop 112 output changes. Thus, there is a reset pulse after the modem 30 is turned on to allow the modem 30 to properly initialize itself.

The non-inverting output of the hard disk flip-flop 114 is the HDISKON signal and is connected to an FET 68 to control the power to the hard disk unit 48.

The non-inverting output of the sleep flip-flop 110 and the inverting output of the LCD flip-flop 116 are provided to the two inputs of a NOR gate 138. The output of the NOR gate 138 is the LCDON signal which is connected to an FET 70 to control the supply of power to the LCD 50. The coupling of the SLEEP and LCD flip-flop output signals is to prevent the LCD power from being removed in improper sequence and possibly damaging the LCD 50.

Figure 4:
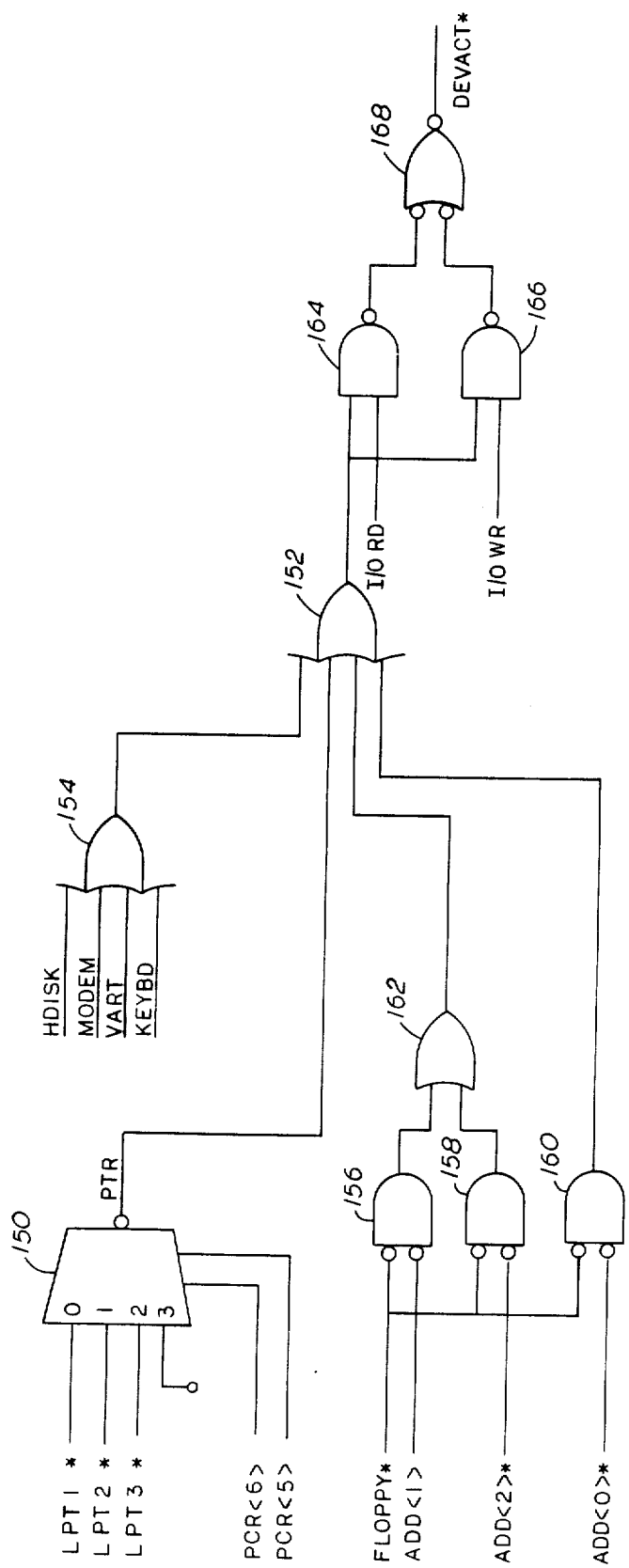

The computer system C includes a parallel printer interface 36. In the preferred embodiment, this parallel printer interface 36 can be addressed at any one of three selectable addresses which are generally referred to as LPT1, LPT2 and LPT3. The selection of which of the three printer locations is defined by the state of two bits in a peripheral control register, the two signals corresponding to the two bits referred to as PCR<6> and PCR<5>. These two signals are provided to the gating inputs of a 4:1 multiplexer 150, which has an inverted output (FIG. 4). A signal referred to as the LPT1* signal is applied to the zero channel input of the multiplexer 150 and is true when an access is being made to the address of the LPT1 printer which, in the preferred embodiment, has an address of 3BC-3BF. A signal referred to as LPT2*, which is indicative of an access to port address 37A-37F, is connected to the second input of the multiplexer 150. A signal referred to as LPT3*, which goes low when an access is made to the address 278-27F, is connected to the third input to the multiplexer 150. The fourth input to the multiplexer 150 is tied to a positive level. The output of the multiplexer 150 is a signal referred to as PTR, and goes high to indicate that an access is being made to the selected printer location. The PTR signal 150 is connected to one input of a four input OR gate 152. Another of the inputs to this four input OR gate 152 is the output of yet another four input OR gate 154. The four inputs to four input OR gate 154 are the HDISK signal, the MODEM signal, the UART signal, and the KEYBD signal. These signals represent, respectively, accesses to the addresses of 1F0-1F7, 2F8-2FF, 3F8-3FF, and 060 and 064. When any one of these signals is present, this indicates that the CPU 22 or other device controlling the bus may be accessing one of these specified addresses.

A signal designated FLOPPY is supplied to one input of a series of three NOR gates 156, 158 and 160. The FLOPPY signal indicates an access request in the address range 3F0-3F7, which the complete range for access to the floppy disk controller 32 in the preferred embodiment. However, because of certain features in other control sequences which are present in the computer system C that had to be retained for compatibility reasons, one address in the range cannot be utilized for inactivity montoring because this address is accessed on a relatively frequent basis to prevent other potential systems problems from occurring and does not necessarily indicate system activity. Therefore the FLOPPY signal must be combined with other bits of the address to determine that the specific undesired address is not being presented. The FLOPPY signal is first combined with the zero or least significant address signal by NOR gate 160 so that any access to an odd address produces a high level signal which is applied to one input of the OR gate 152. The ADD<2> signal representing the second east significant bit of the address is supplied to the an input of a NOR gate 158 along with the FLOPPY signal, so that all addresses having a least significant hexadecimal digit in the range 4-7 are selected. The output from NOR gate 158 is supplied to one input of a two input OR gate 162, whose output is connected to the fourth input of the four input OR gate 152. The second input to the OR gate 162 is provided from a third NOR gate 156 whose inputs are the ADD<1> signal or next least significant bit of the address and the FLOPPY signal, so that the output of the NOR gate 156 goes high only when an address having a least significant hexadecimal digit of 0, 1, 4 or 5 is present. Thus, the NOR gates 156, 158 and 160 produce a high level signal for addresses in the range of 3F0-3F7, except when the address is 3F2, which is the address accessed by the above-given problem.

The output of the four input OR gate 152 indicates that a proper address of the monitored devices has been presented on the address bus 20. This signal is provided to one input of each of two different two input NAND gates 164 and 166. The second input of the NAND gate 164 is a signal referred to as I/ORD, which indicates that a valid I/O address space or port read operation is in progress. The second input to the other NAND gate 166 is a signal referred to as the I/OWR signal, which indicates that a valid I/O address space write operation is in progress. The use of these two signals is necessary in combination with the addressing information to determine that the monitored devices are actually being accessed. The outputs of the NAND gates 164 and 166 are supplied to two inputs of an AND gate 168 whose output is the DEVACT* signal, which is low when a monitored device is being accessed. The DEVACT* signal is low only the length of the I/ORD or I/OWR signals in the preferred embodiment because the I/O control signals are present for shorter periods than the address information.

Figure 3:
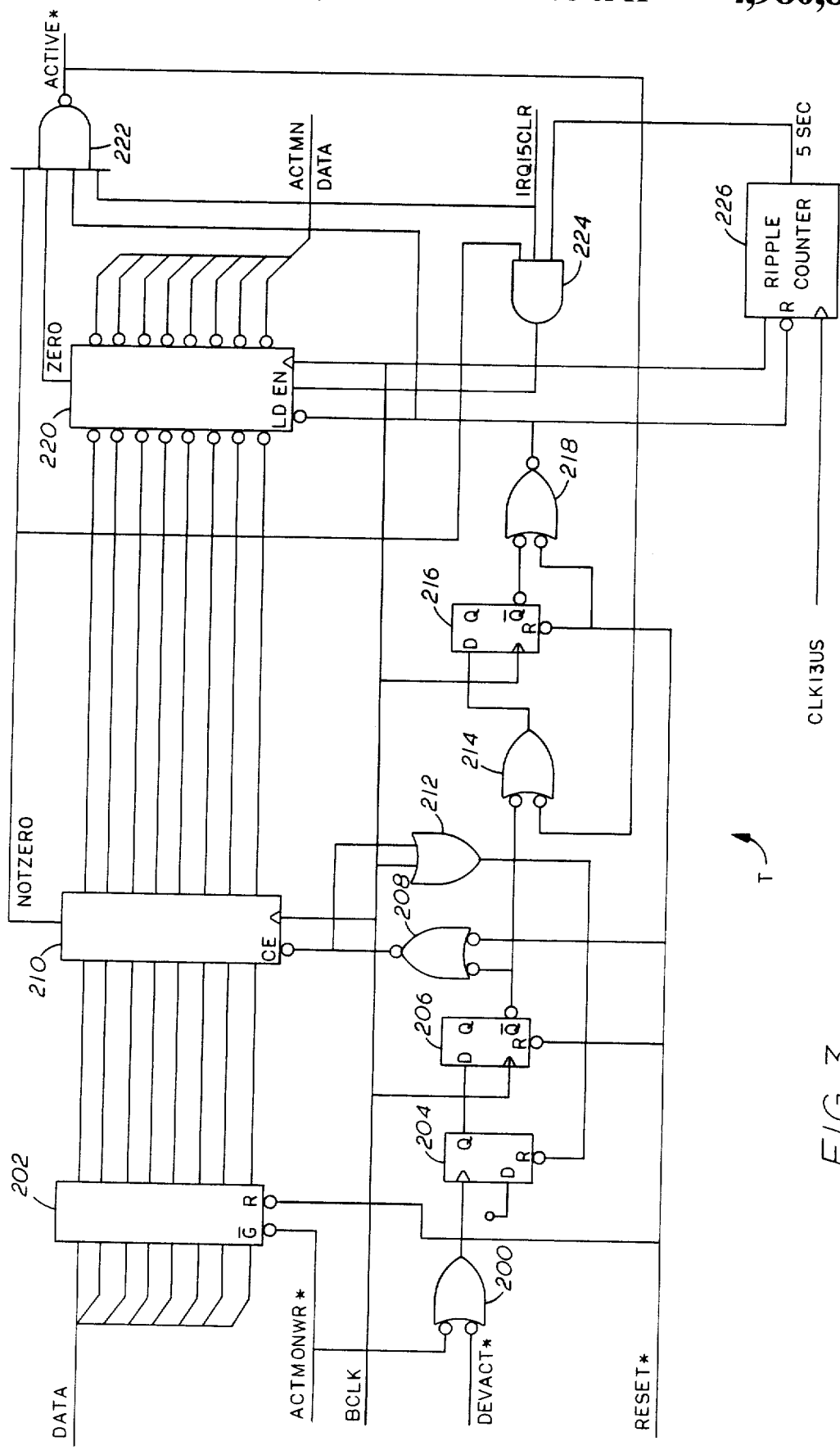

The DEVACT* signal is applied to one input of a two input NAND gate 200 (FIG. 3). The second input to the NAND gate 200 is a signal designated ACTMONWR*, which indicates that a write operation is occurring to the activity monitor interval register. The ACTMONWR* signal is also supplied to the enabling input of a latch 202. The data input signals to the latch 202 are provided by connection to the data bus 20, so that the latch 202 is a first register or buffer contained in the activity monitor timer T.

The output of the NAND gate 200 is connected to the clock input of a D-type flip-flop 204. The D input is connected to a high level signal so that whenever the DEVACT* signal is deactivated to a high state indicating that an access to a monitored device has just completed, the flip-flop 204 is clocked. The noninverted output of the flip-flop 204 is connected to the D input of a second D-type flip-flop 206. The clocking input of the flip-flop 206 is supplied by the BCLK signal. The inverting output of the flip-flop 206 is connected to one input of a two input AND gate 208, whose output is connected to the inverted chip enable input of a second latch 210. This use of two latches 202 and 210 allows the activity monitor timer T to be double buffered. Additionally, the register 210 includes an output which indicates that the value latched in the latch 210 is not zero. The clocking input signal to the second latch 210 is the BCLK signal.

The output of AND gate 208 is also connected to one input of a two input OR gate 212, whose other input is the BCLK signal. The output of OR gate 212 is fed back to the reset input of flip-flop 204 so that each time the DEVACT* signal is propagated through the two flip-flops 204 and 206, the first flip-flop 204 is cleared.

The inverting output of the second flip-flop 206 is also connected to one input of a two input NAND gate 214. The output of the NAND gate 214 is connected to the D input of a D-type flip-flop 216 whose clocking input is supplied by the BCLK signal. The inverting output of the flip-flop 216 is connected to one input of an AND gate 218 and the output of the AND gate 218 is connected to the inverted load input of the countdown timer 220, which forms the loadable portion of the timing elements of the activity monitor timer T. The timer 220 has an output which indicates when the timer 200 has reached a zero value. The output of the AND gate 218 is also connected to one input of a four input NAND gate 222 whose output is designated the ACTIVE* signal and indicates that a device has been active and the activity monitor timer T has not counted to zero. The NOTZERO signal provided by the latch 210 is connected to one input of the NAND gate 222 and the ZERO signal output from the timer counter 220 is provided to yet another input of the NAND gate 222. The fourth and final input of the NAND gate 222 is a signal described as IRQ15CLR, which indicates that the interrupt request 15 has been cleared. The inputs to the NAND gate 222 are true only when the activity monitor timer T is enabled by the value of the latch 210 not being zero, a device is not active as indicated by the output of AND gate 218, the countdown timer 220 is at zero count and the level 15 interrupt has been cleared. This is a general condition that the computer system C has been inactive for a sufficient period of time as indicated by the value from which the activity monitor timer T counted down.

The IRQ15CLR signal and the NOTZERO signal are provided as two inputs to a three input AND gate 224. The third input to AND gate 224 is a signal referred to as 5SEC which is a pulse having a width of one BCLK signal cycle and occurs every five seconds. This pulse is produced by a ripple counter 226 which has the BCLK signal as one input to produce the necessary pulse width, a second signal input of the CLK13μS signal to produce an initial clock cycle which is divided down to a five second cycle and a reset signal provided by the output of the AND gate 218. The output of the AND gate 224 is provided to the enable input of the countdown timer 220 and is synchronized to the BCLK signal the clocking input to the countdown time 220, so that the countdown timer 220 is advanced or decremented only one count per five second interval. The data outputs of the first latch 202 are connected in parallel to the data inputs to the second latch 210, whose data outputs in turn are connected to the inverting data inputs of the countdown timer 220. The inverted data outputs of the timer 220 are provided to the data bus 20 over a line or series of lines referred as to as the ACTMN data lines to provide the activity monitor timer value to the CPU 22. In this way the CPU 22 can determine the actual countdown time remaining prior to entering a sleep or standby status.

The ACTIVE* signal is connected to the second input of NAND gate 214 and when the ACTIVE* signal goes low, this causes the output of NAND gate 214 to go high, so that on the second BCLK signal rising edge after a monitored device has been accessed, the countdown timer 220 is reloaded and the process is reinitiated and the ACTIVE* signal returns to a high state. This pulse width of the ACTIVE* signal is sufficient for the level 15 interrupt to be generated as needed to start execution of the interrupt routine which determines if and when it is appropriate to go into standby mode. The two latches 202 and 210 and the two flip-flops 206 and 216 are reset by a low level of the RESET* signal.

Thus, the combination of flip-flops 204, 206 and 216 and various logic gates 200, 208, 212, 214 and 218 reset and retrigger the countdown timer 220 each time a monitored device is activated. For example, a clocking signal appears at flip-flop 204, which then provides a high signal to the D input of flip-flop 206, whose inverting output in turn goes low at the next rising edge of the BCLK signal. This low output on the inverting output of flip-flop 206 enables the second latch 210 to be reloaded on the next rising edge of the BCLK signal and the output of flip-flop 216 to go low on that same BCLK signal edge. On the next BCLK signal rising edge after that, the countdown timer 220 is reloaded and thus the countdown process recommences.

Figure 5:
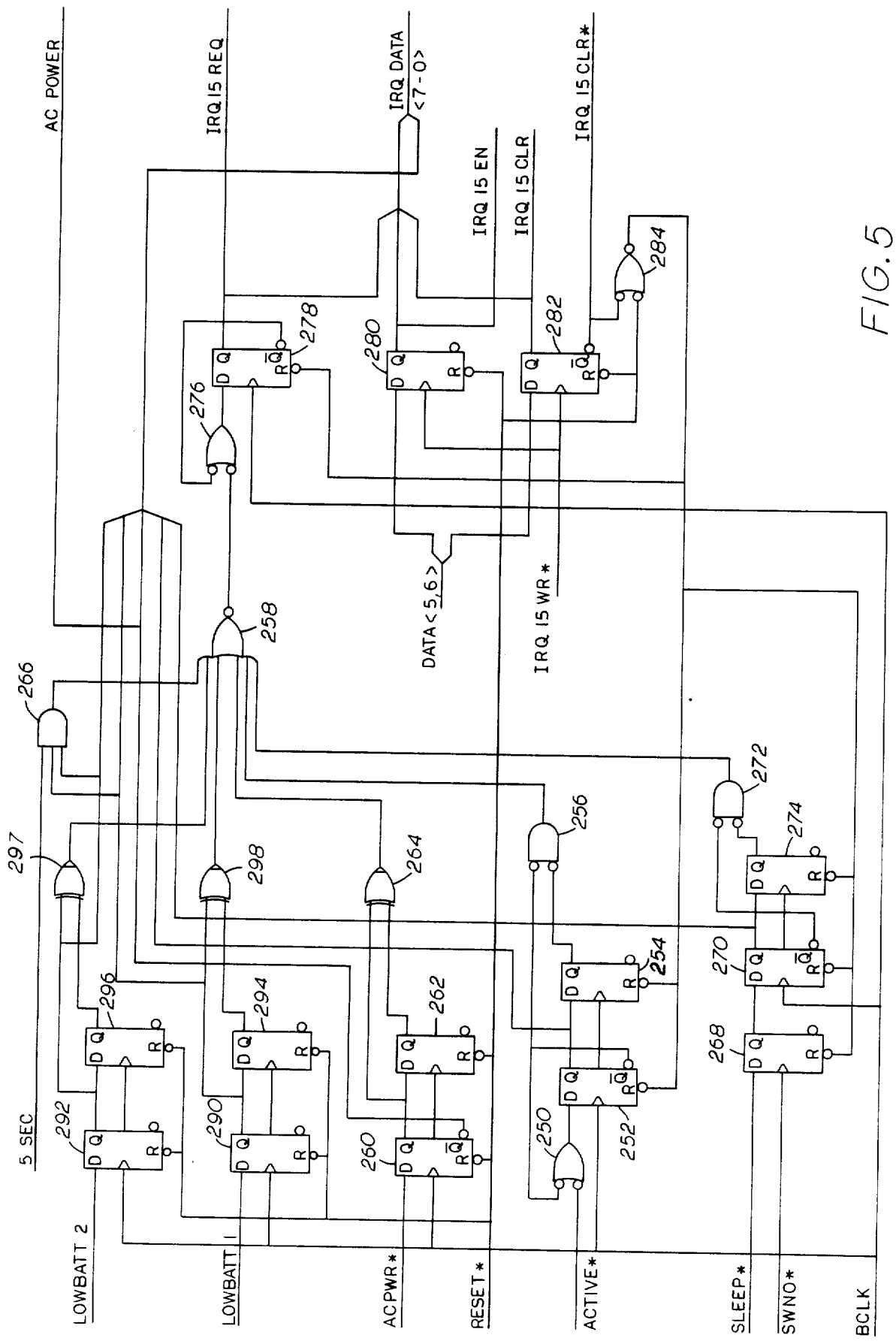

The ACTIVE* signal is applied to one input of a two input NAND gate 250 (FIG. 5). The output of this NAND gate 250 is connected to the D input of a D-type flip-flop 252. This flip-flop 252 is clocked by the BCLK signal. The non-inverting output of flip-flop 252 is the active status bit of the interrupt request register and is provided to the processor by means of the IRQ-DATA<7—0> lines and appropriate buffering. The non-inverting output of flip-flop 252 is also supplied to the D input of a flip-fop 254, which flip-flop 254 is also clocked by the BCLK signal. The inverting output of the first flip-flop 252 is connected to the second input of the NAND gate 250 and to the first input of a NOR gate 256. By this connection, the D input to the flip-flop 252 remains high after the initial pulse is received on the ACTIVE* signal so that the state of the activity status of the computer system C can be determined at any time. The output of the second flip-flop 254 is provided to the second input of the NOR gate 256, whose output is connected to one input of a six input NOR gate 258. The output of the two input NOR gate 256 is a pulse having a length of one BCLK signal cycle. In this manner only a short pulse is formed and provided to the NOR gate 258 when the inactivity timeout is reached to cause the IRQ15REQ signal to be developed.

As can be seen by the fact that there are six inputs to the NOR gate 258, there are a plurality of different ways in which the IRQ15REQ signal can be generated. These additional ways are provided in the preferred embodiment to allow the computer system C to know the states of various events and switches relating to power usage and to warn the user at appropriate intervals. For example, the ACPWR* signal is provided to the D input D-type of flip-flop 260, whose clocking signal is the BCLK signal. The non-inverting output of the flip-flop 260 is connected to the D input of a D-type flip-flop 262 and to one input of a two input XOR gate 264. The second input to the XOR gate 264 is provided by the noninverting output of the second flip-flop 262, which flip-flop is clocked by the BCLK signal. The output of the XOR gate 264 is thus a one BCLK signal cycle length pulse which occur whenever the condition of the AC power changes and is provided to the NOR gate 258 to generate the IRQ15REQ signal. The state of the ACPWR* signal is stored and transmitted to the IRQDATA lines by the inverting output of the flip-flop 260. Thus, the NOR gate 258 is utilized to allow the computer system C to note any change in the AC power status such as, for example, when the AC adaptor is provided or removed. This allows the computer system C to note when it is entering battery-powered operation and thus the power conservation mode may be appropriate. This operation is seen in more detail in the flowchart illustrations of the operating sequences of the computer system C.

Similar flip-flop circuits are present for utilizing the LOWBAT1 and LOWBAT2 signals. Thus two inputs to the NOR gate 258 indicate whenever the computer system C has changed the battery charge status to or from LOWBAT1 or LOWBAT2. The actual LOWBAT signals are latched by a first D-type flip-flop 290 and 292 in the series and the noninverted outputs are presented to the IRQDATA lines. A second D-type flip-flop 294 and 296 is closed by the BCLK signal and has the D input connected to the preceding flip-flop 290 and 292 noninverting output. The noninverting outputs of the flip-flops 290 and 292 and 294 and 296 are the inputs to an XOR gate 297 and 298, whose output is connected to NOR gate 258 to produce the necessary signal to trigger a level 15 interrupt.

The 5SEC signal is combined with the latched LOWBAT2 and LOWBAT1 signals by AND gate 266 whose output is connected to NOR gate 258, so that whenever the computer system C is in a LOWBAT2 condition, every five seconds a level 15 interrupt is received to allow the user to be reminded that he is in LOWBAT2 condition and that there is very little energy remaining in the batteries 54.

The final input to NOR gate 258 is based on the SLEEP* signal and the SWN0* signal. The combination of the signals is used to indicate that the user has pressed the standby switch 58 while the computer system C is active and that the computer system C is to go to an inactive status or standby, based on the user demand. The SLEEP* signal is provided to the D input of a D-type flip-flop 268 with the SWN0* signal provided to the clocking input. In that way, if the SLEEP* signal is high indicating that the computer system C is active, when the standby switch 58 is depressed, a high state is produced at the noninverting output transmitted to the noninverting output of the flip-flop 268, which is connected to the D input of a next D-type flip-flop 270. The clocking signal to the second flip-flop 270 is provided by the BCLK signal. The noninverting output of flip-flop 270 is provided to the IRQDATA lines and is considered to be the standby switch signal which is interpreted by the CPU 22. The inverted output of flip-flop 270 is provided to one input of a NOR gate 272. The non-inverting output is also supplied to the D input of a third D-type flip-flop 274, which is clocked by the BCLK signal. The non-inverting output of flip-flop 274 is connected to the second input of the NOR gate 272, so that in a manner similar to the circuitry relating to the ACTIVE* signal, only a short pulse one BCLK signal cycle in length is presented to the NOR gate 258 to indicate the user's desire to place the computer system C in standby mode.

The output of the NOR gate 258 is connected to one input of a NAND gate 276, whose output is connected to the D input of the IRQ15 D-type flip-flop 278. The IRQ15 flip-flop 278 is clocked by the BCLK signal and has the inverting input coupled back to the second input of the NAND gate 276. In this way, whenever a pulse is received by the NOR gate 258, the signal is detected by the IRQ15 flip-flop 278 and latched in until the IRQ15 flip-flop 278 is reset. The non-inverting output of the IRQ15 flip-flop 278 is the IRQ15REQ signal which is supplied to the interrupt controller which is interfaced to the CPU 22 and handles the processing of the interrupt request.

There are two remaining flip-flops utilized in the power conservation circuitry relating to the interrupt circuitry and these are the IRQ15EN D-type flip-flop 280 and the IRQ15CLR D-type flip-flop 282. The IRQ15EN flip-flop has its D input coming from the data bus 20 and is clocked by a signal referred to as the IRQ15WR* signal, which indicates that a write operation is occurring to the IRQ15 register. The IRQ15 register location provides the states of the signals forming the IRQDATA lines during a read operation and allows data to be written to the IRQ15EN and IRQ15CLR flip-flops 280 and 282 during write operations. The data present on the data bus is latched at this time and the output of the IRQ15EN flip-flop 280 is provided to the IRQDATA lines and is the IRQ15EN signal.

Also clocked in by the IRQ15WR* signal is another bit of the data bus 20, which is the IRQ15CLR signal.

When a high state of this signal is clocked in, the non-inverting output of the IRQ15CLR flip-flop 282 is the IRQ15CLR signal, goes to a high state and is fed back to the IRQDATA lines for evaluation by the CPU 22. The inverting output of the IRQ15CLR flip-flop 282 is the IRQ15CLR* signal and is provided as one input to a two input AND gate 284. The remaining input to this AND gate 284 is the RESET* signal which is also provided to the reset inputs of the IRQ15EN and IRQ15CLR flip-flops 280 and 282 and to the flip-flops in the LOWBAT1, LOWBAT2 and ACPWR portions of the circuitry. The output of the AND gate 284 is a clear signal used to clear the IRQ15 flip-flop 278 and to clear the active flip-flops 252 and 254 and the standby switch flip-flops 268, 270 and 274.

This completes the detailed description of the circuitry utilized in the computer system C according to the present invention to provide the power conservation features of the present invention. This circuitry is used in conjunction with certain operating sequences provided in the read-only memory space of the computer system C to perform the power conservation functions of the present invention.

Figure 6A:
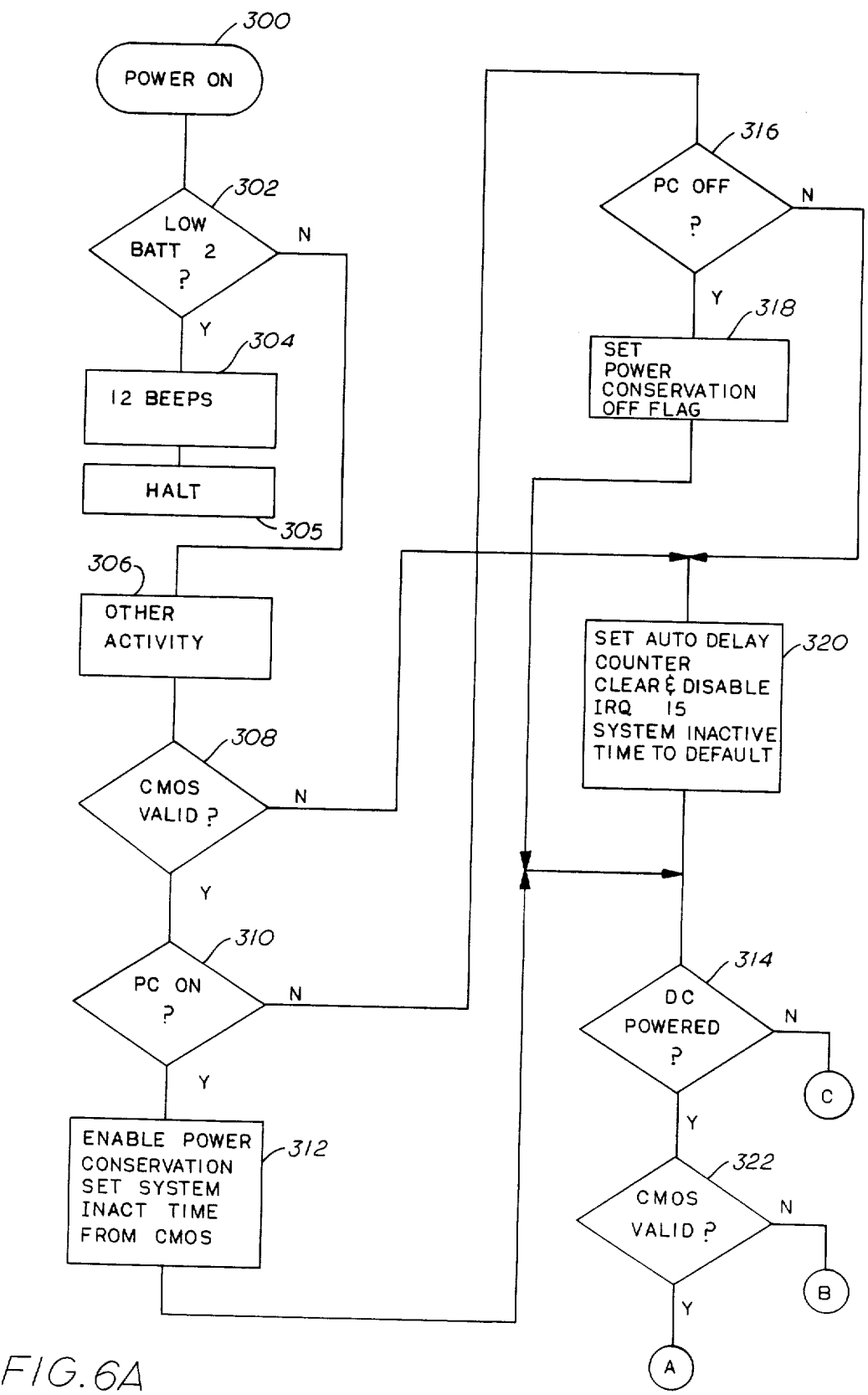
FIGS. 6A, 6B and 6C are flowchart illustrations of sequences for preparing the computer system of FIG. 1 for utilizing the present invention.

When the power to the computer system C is initially turned on, the power on sequence 300 (FIG. 6A) is commenced. The first step of the power on sequence 300 is step 302, where a determination is made by reading the IRQDATA lines as to whether the computer system C is in a LOWBAT2 condition. If the computer system C is in a LOWBAT2 condition, control proceeds to step 304 where 12 beeps are issued to warn the user of this state and control proceeds to step 305 where the computer system C is halted. Thus, when the computer system C is in a LOWBAT2 condition, it cannot be used until it is removed from this condition. This is done because it is presumed that there is insufficient energy in the batteries 54 to allow any significant activity of the computer system C and so the possibility of losing data is not allowed.

If the computer system C is not in a LOWBAT2 condition, control transfers from step 302 to step 306 where other activity relating to powering up the system is performed. After completing this necessary activity, control proceeds to step 308 where a determination is made as to whether the values contained in the CMOS RAM 26 are valid. The CMOS RAM 26 is used to contain certain values relating to the configuration of the system C which allows the computer system C not to ask the user this information or have the information stored in a file contained on a disk. If the CMOS information is valid, control proceeds to step 310 where the computer system C determines whether power conservation should be activated. There are two bits contained in a register in the computer system C which are used to indicate the desired initial state of the power conservation system. The three states that are available are the power conservation On State, the power conservation Off State, and a power conservation Auto State. In the power conservation On State, the power conservation techniques of the present invention are utilized at all times. In the power conservation Off State, the power conservation techniques are not utilized. The preferred initial state is the power conservation Auto State, which is utilized so that the computer system C can determine which operating system will be controlling the operations of the machine after booting operations are completed. Thus, power conservation in the Auto State is enabled when certain operating systems are employed and is not operational when certain other operating systems are employed. This allows the greatest flexibility of operation.

If the computer system C determines in step 310 that the power conservation is selected to be on, control proceeds to step 312 where the power conservation mode is enabled and the system inactivity timer or activity monitor timer T is set with a value obtained from the CMOS 26. Control then proceeds to step 314.

If it was determined in step 310 that the power conservation mode was not to be enabled on at all times, control proceeds to step 316 where a determination is made as to whether power conservation features are to be turned off. If so, control proceeds to step 318 where the power conservation off flag is set for further use in later operations and then control proceeds to step 314. If the power conservation Off State was not selected in step 316, or if the CMOS was determined to be not valid in step 308, control proceeds to step 320 where the computer system C sets the auto delay counter for a sufficient interval, generally 70-85 seconds, so that the remaining portions of the power up routine and operating system are executed and locked, and an interrupt is developed after that period of time. This allows sufficient time for the operating system to be installed in the computer system C and begin controlling operation of the computer system C. If the operating system does not allow access to the ROM memory portion where the auto delay interrupt routine is located, then a proper entry to that selected interrupt will not be obtained, and power conservation will not be enabled. Also in step 320, the IRQ15 is cleared and disabled by writing the proper values to the IRQ15 register. Finally in step 320, the system inactivity timer T is set to the default value.

Figure 6B:
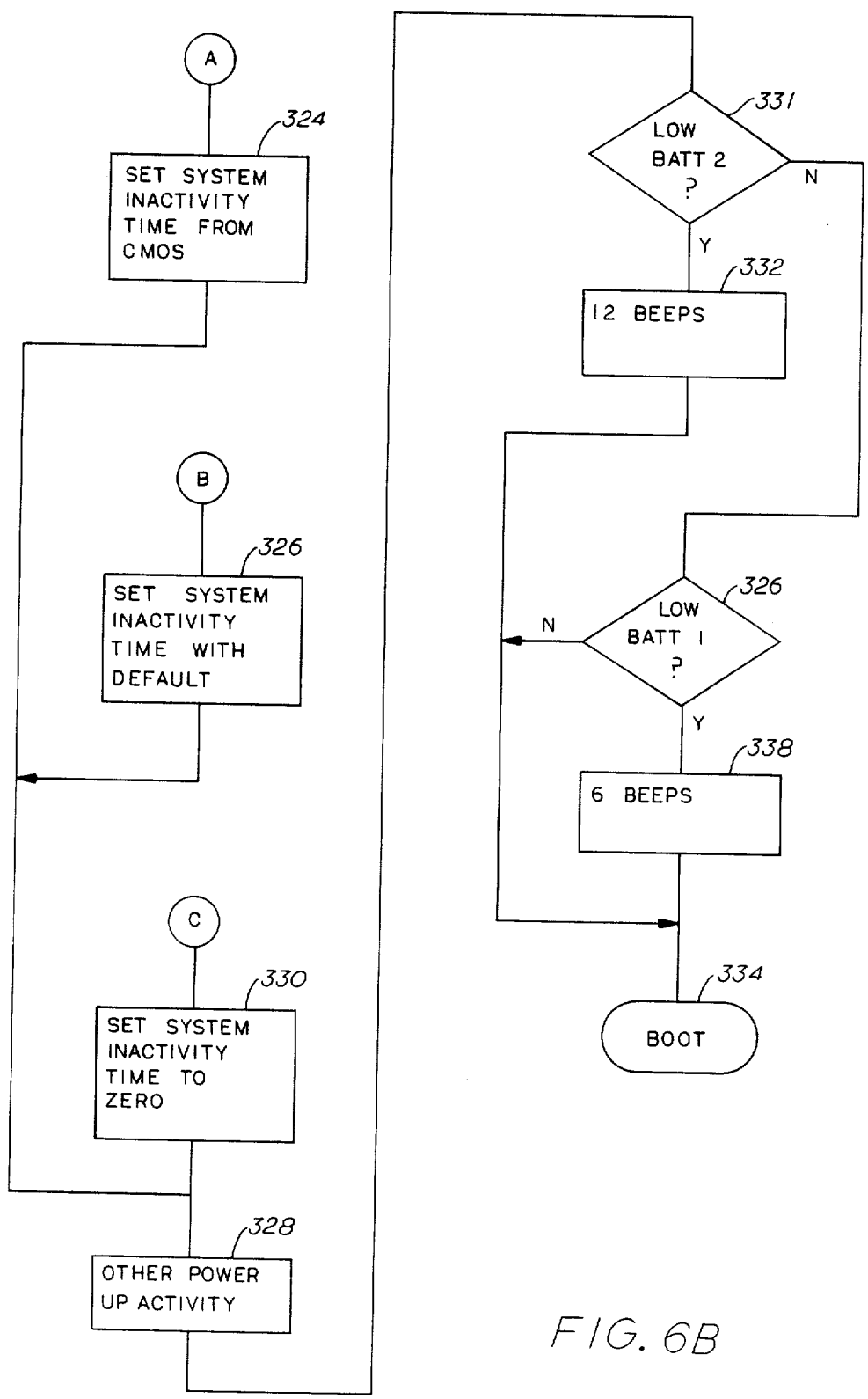

Control then proceeds from step 320 to step 314 where the computer system C determines if the computer system is being powered by the batteries 54. If so, control proceeds to step 322 where a second check is made to see if the CMOS 26 is valid. If so, control proceeds to step 324 (FIG. 6B) where the system inactivity timer T is set with the value contained in the CMOS 26. If the CMOS 26 is not valid, control proceeds to step 326 where the system inactivity timer T is set with a default value. Control proceeds from step 326 or from step 324 to step 328.

If it was determined in step 314 that the system was not powered by the battery, that is, was powered by the AC adaptor or from an external base unit, control proceeds from step 314 to step 330 where the system inactivity time is set to zero because there is no need to conserve power when powered from the external source and a zero value in the latch 210 prevents the ACTIVE* signal from being asserted. Control proceeds from step 330 to step 328, where other necessary power up and self-test activities are performed. Control then proceeds from step 328 to step 331 where the computer system C makes a second determination as to whether a LOWBAT2 state exists. If so, control proceeds to step 332 where the user is again prompted with 12 beeps as an audible indication that the LOWBAT2 condition exists. Control then proceeds to step 334 which is the beginning of the boot sequence in which the operating system is loaded in from the storage media.

If the computer system C is not in a LOWBAT2 condition, control proceeds from step 331 to step 336 where a test is made to see if the computer system C is in a LOWBAT1 condition. If so, control proceeds to step 338 where 6 beeps are issued, thus allowing the user to distinguish between the LOWBAT1 and LOWBAT2 conditions audibly. Control then proceeds from step 338 to step 334, which is also where control would proceed from step 336 if the computer system C was not in a LOWBAT1 condition. The computer then proceeds to boot up and load the operating system.

Figure 6C:
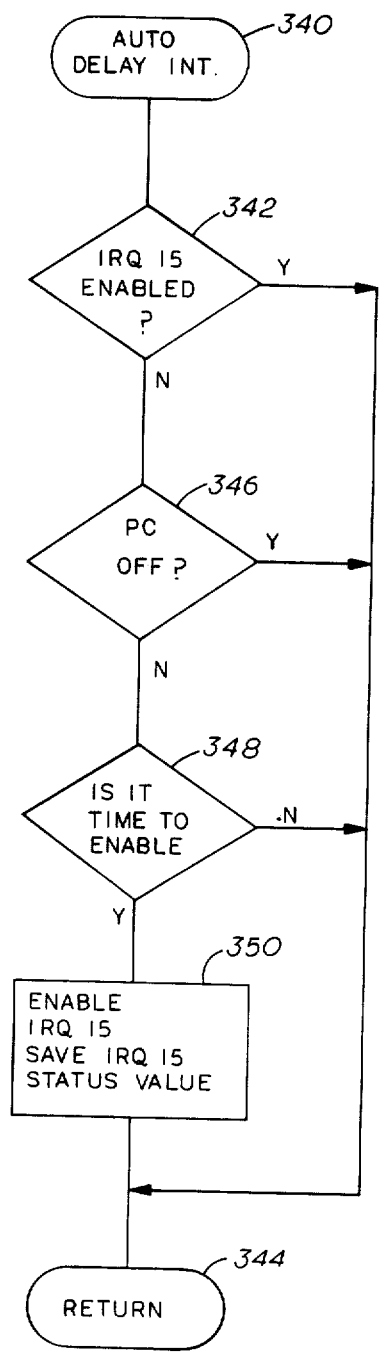

If the selected power conservation mode was automatic, a timer is set in step 320 with the auto delay interrupt time and eventually an auto delay interrupt occurs. If the operating system in control of the machine at that time is one which allows access to the read-only memory portions of the computer system C containing the proper routine, then control proceeds to the auto delay interrupt sequence 340 (FIG. 6C). Control starts in sequence 340 by having the computer system determine whether IRQ15 has been enabled in step 342. If IRQ15 is enabled, this indicates that the power conservation mode is already active to cause interrupts and thus be recognized for action. If IRQ15 is enabled, control proceeds to step 344, where control is returned to the interrupted sequence. If IRQ15 is not enabled in step 342, control proceeds to step 346 where a determination is made if the desired power conservation mode is off. If so, control proceeds to step 344 and returns. If the power conservation mode is not off, control proceeds from step 346 to step 348 where a determination is made to see if it is time to enable power conservation. If not, control proceeds to state 344. If it is time, control proceeds to step 350 where IRQ15 is enabled, and the IRQ15DATA lines or status value is saved for later use. Control then proceeds to step 344, and operation proceeds in the interrupted sequence.

Whenever the inactivity timer has timed out such that it is appropriate to enter standby mode or when one of the various parameters related to power conservation such as the power source, the battery condition, or a user request for standby status is developed, a level 15 interrupt or IRQ15 is requested, and an IRQ15 interrupt sequence 400 is performed. The preferred embodiment uses IRQ15 for this purpose because it is generally not a defined interrupt and thus is relatively available with a minimum number of conflicts with application software. The IRQ15 sequence 400 begins at step 402 where the computer system C reads the IRQ15 status values from the IRQDATA lines and retrieves the old IRQ15 status values from a saved location in memory. Control proceeds from step 402 to step 404 where write operations are performed to the IRQ register so that the pending IRQ15 is cleared and remains enabled. Control then proceeds to step 406 where a determination is made as to whether the system was previously AC powered. If so, control proceeds to step 407 where a determination is made to determine if the computer system C is switching to battery powered operation. If it is powered by an external source, control proceeds to step 408 where a determination is made as to whether the old and new IRQ15 status values are equal. If so, control proceeds to step 410 which determines if the user has cancelled the standby request by pushing the standby key a second time after the initial time which initiated the execution of this sequence. If not, control proceeds to step 414 where the computer system determines if the battery is in the LOWBAT2 condition. If the battery charge is not in the LOWBAT2 condition, step 414 transfers control to return step 412. However, if the LOWBAT2 condition exists, control proceeds to step 416 where 12 beeps are issued to remind the user of the presence of the LOWBAT2 state. This path is executed on 5 second intervals because the 5 second counter is one input to the IRQ15 NOR gate 258 via AND gate 266 and is not provided to the IRQDATA lines for direct determination by the computer system C.

If the old and new IRQ15 status values were different, control proceeds from step 408 to step 418 where a determination is made to see if the state of the LOWBAT1 condition has changed. If so, this generally indicates that a LOWBAT1 condition has developed and control proceeds to step 420, where 6 beeps are emitted to indicate the presence of the LOWBAT1 condition to the user, the battery charge LED 64 is set to flash at a 1 Hz rate, and the system inactivity timer T is set at a value of 2 minutes. The system activity timer is set at this low value from the generally 10 minutes used before low battery conditions exist to allow increased conservation of the energy remaining in the batteries. From step 420, control proceeds to step 422 where control is returned to the interrupted sequence.

Figure 7A:
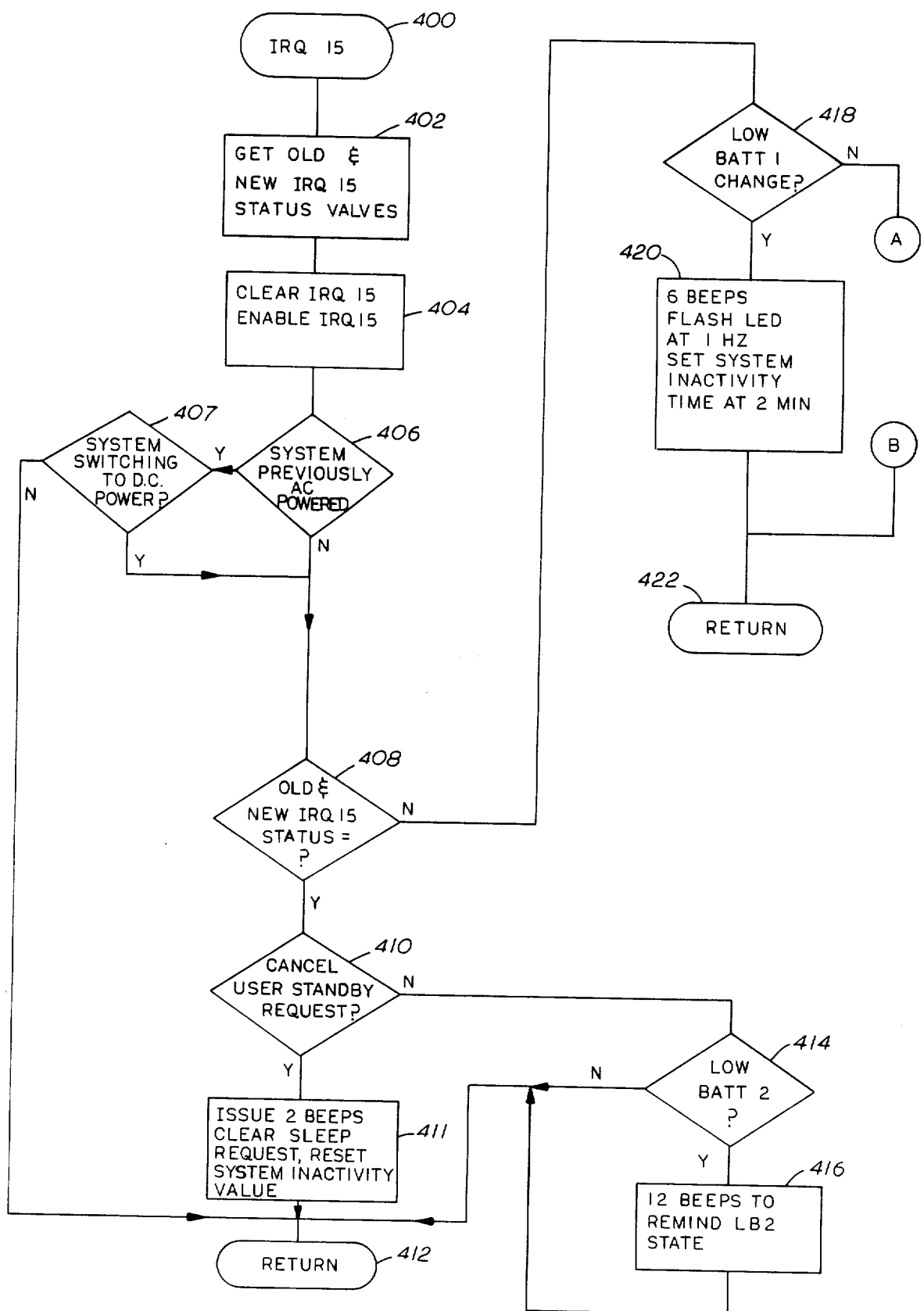
FIGS. 7A, 7B and 7C are flowchart illustrations of a sequence for controlling portions of the computer system of FIG. 1 according to the present invention.
Figure 7B:
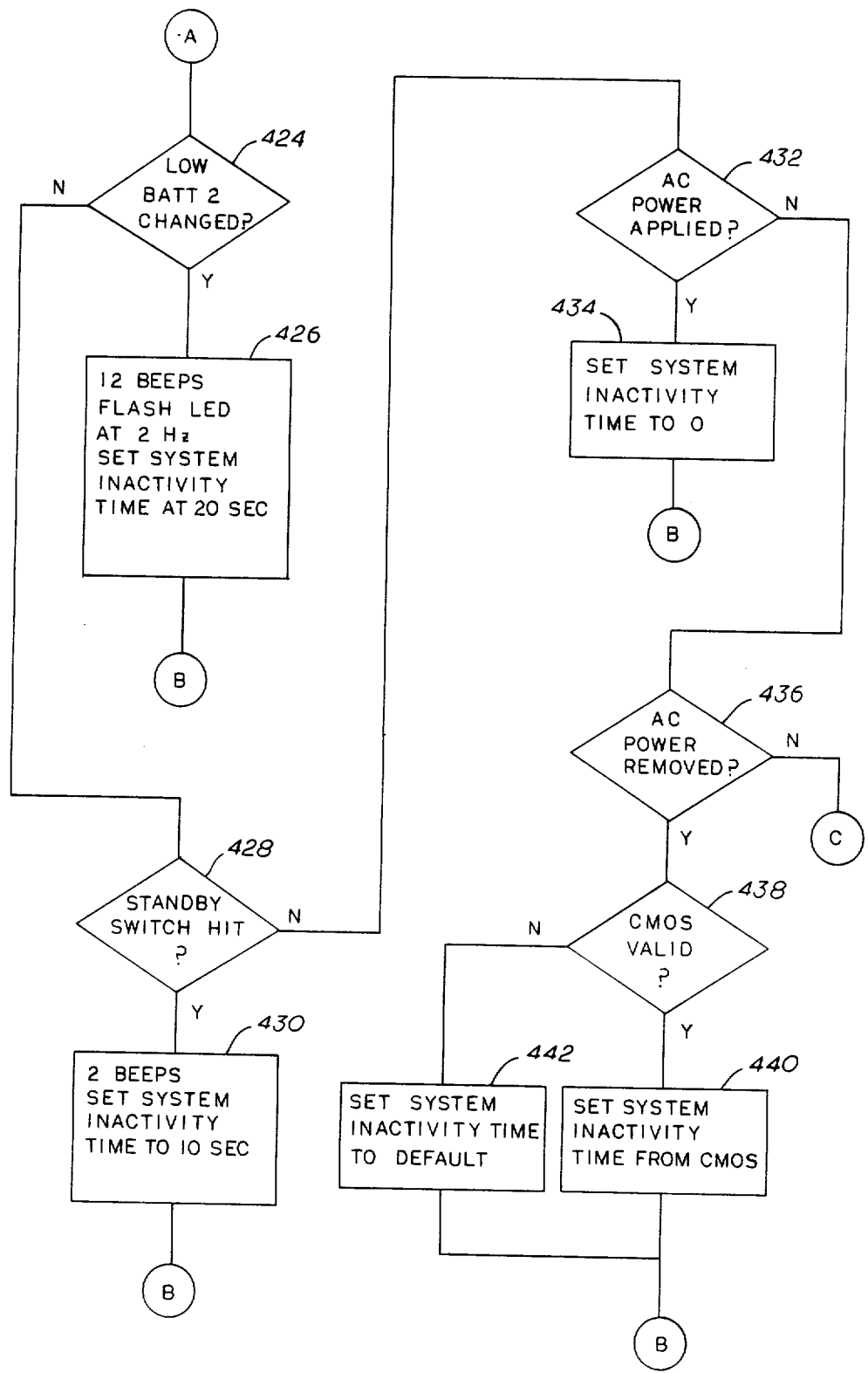

If the state of the LOWBAT1 bit in the IRQ15 status register has not changed, control proceeds from step 418 to step 424 (FIG. 7B). In step 424, the computer system C determines whether the state of the LOWBAT2 bit has changed. If it has changed, control proceeds to step 426 where the computer system C causes 12 beeps to be emitted to indicate to the user that the system C has now entered a LOWBAT2 condition, and the battery charge LED 64 is flashed at a 2 Hz rate to indicate the urgency of the situation. Also in step 426, the system inactivity time is set at a very short 20 consecutive second interval so that should any of the monitored devices not be used for 20 seconds, the system will automatically enter standby mode, and once standby mode has been entered from the LOWBAT2 condition, it is not possible to recover or restart the machine without plugging in an external power source. This very short time is used because it is presumed that there is very little energy left in the batteries 54, and that if any significant use is made of the various peripheral devices, any information existing in the memories may be lost. Control proceeds from step 426 to step 422, and control is returned to the interrupted program.

If the LOWBAT2 bit had not changed, control proceeds from step 424 to step 428 where the CPU 22 determines whether the standby switch 58 has been depressed by the user. If so, 2 beeps are emitted to acknowledge the switch depression and the system inactivity time is set to 10 seconds. The system is not immediately made inactive at this time so that various operations which may be active can be completed. For example, the user may start a file transfer program or start a save operation from his applications program and be ready to leave the machine, so he starts operation, depresses the standby button 58 and leaves. If the system were to go into standby mode immediately, the data would not necessarily be saved away onto the appropriate media, but could be lost if the user remained away for a significant period of time. Therefore, the system first waits until all file transfer operations are completed and then enters a standby mode. After step 430, control proceeds to step 422, and control is returned to the interrupted program.

If the standby switch 58 has not been hit as determined in step 428, control proceeds to step 432, where a determination is made to see whether AC or external power has been applied to the computer system C to charge the batteries. If so, it is no longer necessary for the system to be in power conservation mode and to receive the system inactivity interrupts, so in step 434 the system inactivity time is set to zero. As mentioned in the discussion of the register 210, the NOTZERO signal of latch 210 develops and is one input to a four input NAND gate 222, so that when a zero value is written to the system inactivity latches 202 and 210, the output of this NAND gate 222 is made high because the NOTZERO signal goes low. Thus, there are no activity monitoring events provided to the flip-flops 252 and 254, and the inactivity interrupts are not generated. However, the power source conversion and the battery monitoring functions remain active. After step 434 is completed, control is returned to step 422 for a return to the interrupted sequence.

If AC power has not been applied as determined in step 432, control proceeds to step 436 where it is evaluated as to whether AC power has been removed. If AC power has been removed, this is an indication that battery power operation has commenced, and in step 438, a check is made to see whether the CMOS 26 is valid. If so, in step 440, the system inactivity time is set from the CMOS value, while if the CMOS 26 is not valid in step 442, the system inactivity time is set to a default value. Control proceeds from either step 440 or 442 to step 422 and to the interrupted program.

Figure 7C:
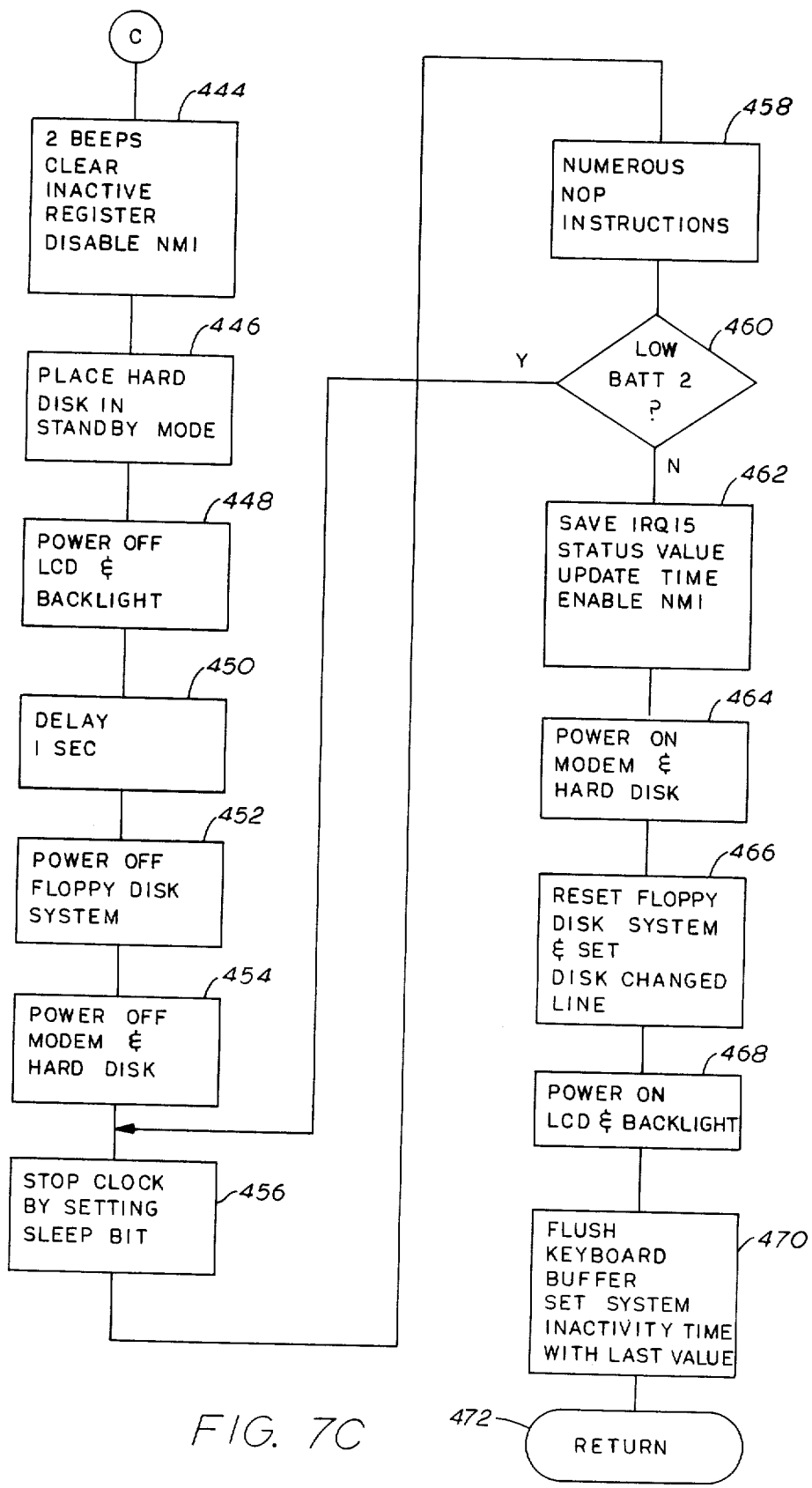

If AC power was not removed, this has completed all the possibilities which could cause a power conservation interrupt except for the inactivity timer, and control thus proceeds from step 436 to step 444 (FIG. 7C). In step 444, 2 beeps are issued to indicate that the system is about to go into standby mode, the inactivity register is cleared, and the non-maskable interrupt is disabled. Control then proceeds to step 446 where the hard disk 48 is placed in standby mode by issuing a proper command to the hard disk controller 34 to cause the hard disk 48 to enter this state. This state allows the hard disk 48 to start spinning down in a proper manner. Control then proceeds to step 448 where the power is turned off to the LCD 50 and to the backlight. After turning the power off, control proceeds to step 450 for a delay of 1 second. This time is to allow the hard disk to spin down. After this 1 second delay is completed, control proceeds to step 452, where a command is issued to the floppy disk controller 32 to power off the floppy disk controller 32. The next step is step 454, where the power is turned off to the modem 30 and the hard disk 48, thereby completing the shutting off of power to the major devices in the computer system C which can be powered down. The next step is step 456, where the SLEEP bit in the power control register is set, thus triggering a series of events where miscellaneous circuitry including the floppy disk unit 46 has its power removed and the clock is stopped.

In step 458 a large number of no operation instructions are performed by the CPU 22. A series of no operation instructions is included so that the system will definitely stop during this interval and will not stop during a potential instruction in which data may need to be transferred for some reason. It is assumed that the system comes to a stop in the middle of this step 458 when performing the no operation instructions. The system stops because the clock has been stopped to the CPU 22 and so the CPU 22 cannot direct any operations. The system is then in standby mode and at its lowest power consumption mode until it is attempted to be awakened by having the user hit the standby switch 58, which would then allow the clock to be restarted according to the circuitry shown in FIGS. 1 and 2.

After the standby switch 58 has been hit and the clock is successfully started, a series of no operation instructions is still performed in step 458 to allow the system to fully come into operation with no truly critical instructions being performed. After the system is thus safely operating and the no operation instructions are completed, in step 460 a determination is made whether the computer system C is currently in LOWBAT2 mode. If it is in this very low energy remaining condition of LOWBAT2, control proceeds to step 456, and the computer system C once again puts itself into standby mode. Therefore, the computer system C does not awaken itself when it is in the LOWBAT2 condition. If the machine were attempted to be restarted in LOWBAT2, the mere energy of powering on of the appropriate devices might drain the remaining energy, and any data which is present in the memory 24 would be lost.

Assuming then that the computer system C is not in the LOWBAT2 state, control proceeds to step 462 where the current IRQ15 status value is saved, the time and date values contained in the memory 24 are updated from the real time clock contained in the CMOS 26, and the non-maskable interrupt is enabled. It is necessary to update the time because clearly some time has passed during the standby state and the system, for its proper operation, needs to be informed of the proper time. While this is understood to involve a discontinuity, this is considered preferable to other options.

Control then proceeds to step 464 where the power to the modem 30 and hard disk 48 is turned on to allow their operation to commence. In step 466, the floppy disk subsystem is reset to allow its operation, and the disk changed line is set. The disk changed line is a line which indicates that the floppy disk which was present in the floppy disk unit 46 may have changed, and therefore, it is necessary to redetermine directory information and other information contained on the disk. This line must be set in this step because it is quite possible that during the standby state the user has exchanged floppy disks, and because the system is in a standby state, the change would not be noticed. The computer system C would try to access the new floppy disk using the old floppy disk information with erroneous results.

Control then proceeds from step 466 to step 468 where the power to the LCD 50 and its backlight are turned on. In step 470, the keyboard buffer is flushed to remove any possible keystrokes or stray keystrokes which may have developed during portions of the standby sequence or were developed due to the various powering on of various items. Also in step 470, the system inactivity time is set to the last value that was present and then control proceeds to step 472 and to the interrupted program, thus completing operation of the standby sequence.

Thus, the computer system according to the present invention monitors various power consumption related events, indicates certain changes to the user and enters an inactivity state upon an appropriate period of time after monitored system devices have been used.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. An apparatus for use with a battery powered computer system for reducing power consumption of the battery powered computer system, the computer system including various circuitry, portions of which is clocked, the apparatus comprising:

an address and data bus for communicating address and data information in the computer system;

a plurality of peripheral devices coupled to said address and data bus, said peripheral devices being accessed over said address and data bus by use of address values associated with each said peripheral device, each said peripheral device capable of being powered off;

means coupled to said address and data bus for accessing said peripheral devices by presenting address values associated with said particular peripheral device on said address and data bus;

means coupled to said address and data bus for analyzing the address values presented on said address bus by said means for accessing to determine if one of said peripheral devices is being accessed and producing a signal indicative thereof;

means coupled to said address value analyzing means and responsive to said address value analyzing means signal for timing an interval since any one of said peripheral devices has been accessed by said accessing means; and means coupled to said timing means and said peripheral devices for powering off said peripheral devices when said interval exceeds a present amount to enter a reduced power consumption state.

2. The apparatus of claim 1, further comprising:
means coupled to portions of the circuitry for enabling power to said circuitry portions; and means coupled to said timing means and said enabling power means for disabling power to the coupled circuitry portions when said interval exceeds a preset amount.

3. The apparatus of claim 1, further comprising:
system clock means for providing a system clock to the clocked portions of the circuitry included in the computer system; and means coupled to said timing means and said system clock means for disabling the system clock to the circuitry portions when said interval exceeds a preset amount.

4. The apparatus of claim 1, further comprising:
means for disabling said powering off means when the computer system is powered from an alternating current electrical source.

5. The apparatus of claim 1, further comprising:
means for powering on said peripheral devices after they have been powered off by said powering off means.

6. The apparatus of claim 5, wherein said means for powering on includes a switch for activation by a user to indicate a desire to leave the reduced power consumption state.

7. The apparatus of claim 5, further comprising:
means for monitoring the remaining battery energy; and means coupled to said remaining battery energy monitoring means and said powering on means for disabling said means for powering on said peripheral devices when the remaining battery energy of the computer system is below a preset level.

8. The apparatus of claim 1, further comprising:
means for disabling said powering off means when desired by a user.

9. The apparatus of claim 1, further comprising:
means for initially disabling said powering off means;
means for allowing an operating system to take control of operations of the computer system;
means for interrupting operation of the computer system after the operating system has taken control; and
means responsive to said interrupt for enabling said powering off means when the controlling operating system allows response to said interrupt.

10. The apparatus of claim 1, further comprising:
means for monitoring the remaining battery energy; and
means coupled to said remaining battery energy monitoring means and said powering off means for reducing the preset amount of said interval when the remaining battery energy of the computer system is below a first given level.

11. The apparatus of claim 10, further comprising:
means coupled to said remaining battery energy monitoring means and said powering off means for further reducing the preset amount of said interval when the remaining battery energy is below a second given level, said second given level being less than said first given level.

12. The apparatus of claim 1, further comprising:
means responsive to a signal from a user for reducing the preset amount of said interval.

13. The apparatus of claim 1, further comprising:
means responsive to a command from a user for modifying the preset amount of said interval.

* * * * *

UNITED STATES PATENT AND TRADEMARK OFFICE
CERTIFICATE OF CORRECTION

PATENT NO. : 4,980,836

DATED : December 25, 1990

INVENTOR(S) : Carter, et al.

It is certified that error appears in the above-identified patent and that said Letters Patent is hereby corrected as shown below:

At column 19, line 36, please change "present" to --preset--.

Signed and Sealed this

Twenty-eighth Day of April, 1992

Attest:

HARRY F. MANBECK, JR.

Attesting Officer

Commissioner of Patents and Trademarks